Sheet 1-2 Sheets.

N. P. Holmes.
Milk Cooler.

N° 60,190. Patented Dec. 4, 1866.

Witnesses:

Inventor:
Noah P. Holmes.

Figure 1:
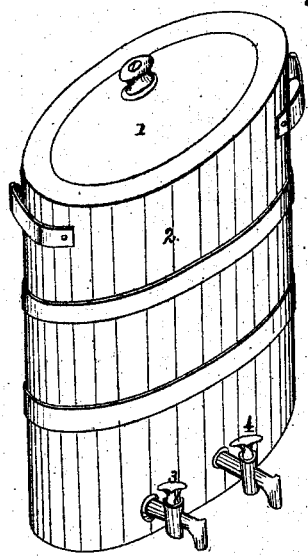
Figure 2:
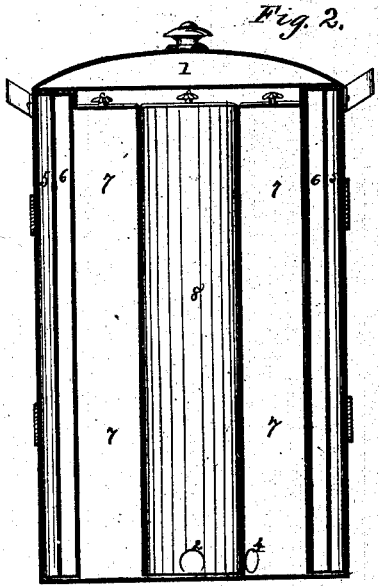

N. P. Holmes.
Milk Cooler.
N° 60,190.    Patented Dec. 4, 1866.
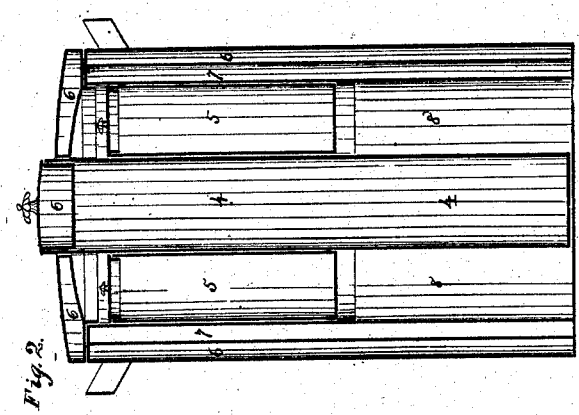
Fig. 2.
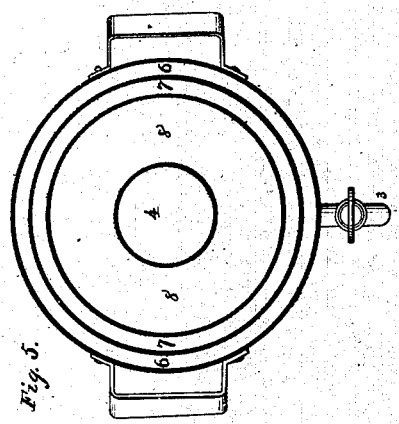
Fig. 5.
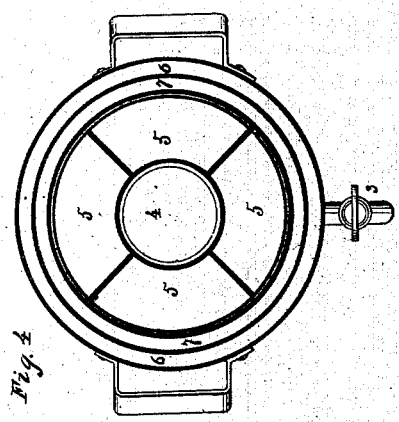
Fig. 4.
Fig. 1.
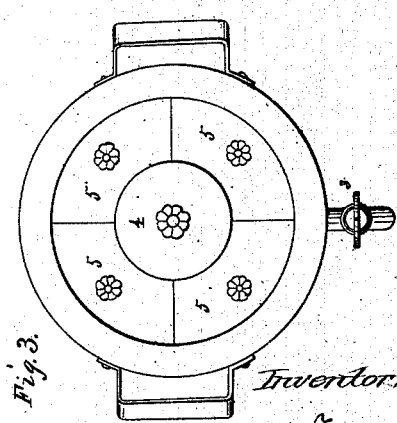
Fig. 3.
Witnesses.
Inventor:
Noah P. Holmes

United States Patent Office.

IMPROVED APPARATUS FOR PRESERVING MILK.

NOAH P. HOLMES, OF INDIANAPOLIS, INDIANA.

Letters Patent No. 60,190, dated December 4, 1866.

SPECIFICATION.

TO ALL WHOM IT MAY CONCERN:

Be it known that I, NOAH P. HOLMES, of Indianapolis, Marion county, State of Indiana, have invented a new and useful improvement on the Apparatus for Preserving Milk which was allowed to me on September 4, 1866; and I do hereby declare that the following is a full, clear, and exact description of the same, reference being had to the accompanying drawings, making part of the same, and to the letters of reference marked theron.

Figure 1 represents a perspective view.

Figure 2, a section.

Figure 3:
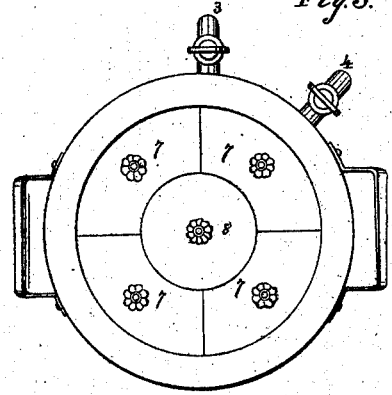

Figure 3, a top view; and

Figure 4:
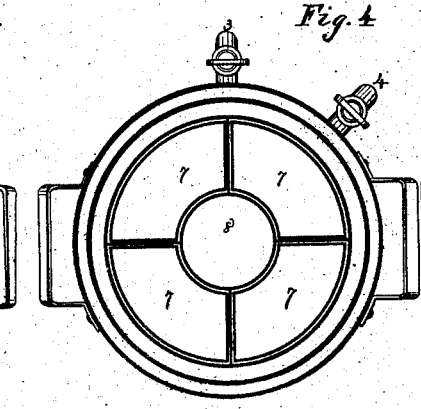
Figure 5:
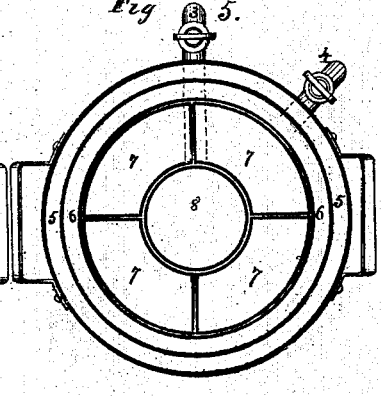

Figures 4 and 5, cross-sections.

My invention consists in making four or more partitions in the round space between the outside ice-chamber, 6, and the central ice-cylinder, 8, and placing these partitions, either stationary or movable, around the cylinder, 8. It also consists in dividing the space from top to bottom of my milk can into two or more apartments and using the lower one for preserving milk, and the upper one or ones for keeping meat and other articles. These partitions may be stationary or movable.

In combination with the external and internal ice-chambers, 6 and 8, I claim the use of horizontal partitions for the subdivision of the preserving-chamber into compartments for various uses, the entire apparatus being constructed substantially in the manner and for the purpose set forth.

NOAH P. HOLMES.

Witnesses:
JNO. S. SMITHMYER,
WM. SULLIVAN.